(12) United States Patent
Ito et al.

(10) Patent No.: US 12,600,878 B2
(45) Date of Patent: Apr. 14, 2026

(54) TOPCOAT LAYER, A LAMINATION FILM CONTAINING THE SAME, AND A DECORATIVE ARTICLE DECORATED BY SAID LAMINATION FILM

(71) Applicant: BASF COATINGS GMBH, Munich (DE)

(72) Inventors: Etsumi Ito, Yokohama (JP); Takeshi Tsunoda, Yokohama (JP); Hideki Yamashita, Yokohama (JP); Hideki Suetsugu, Yokohama (JP)

(73) Assignee: BASF COATINGS GMBH, Muenster (DE)

( * ) Notice: Subject to any disclaimer, the term of this patent is extended or adjusted under 35 U.S.C. 154(b) by 0 days.

(21) Appl. No.: 18/864,794

(22) PCT Filed: May 22, 2023

(86) PCT No.: PCT/EP2023/063559
§ 371 (c)(1),
(2) Date: Nov. 11, 2024

(87) PCT Pub. No.: WO2023/241882
PCT Pub. Date: Dec. 21, 2023

(65) Prior Publication Data
US 2025/0346775 A1 Nov. 13, 2025

(30) Foreign Application Priority Data
Jun. 16, 2022 (JP) ................................. 2022-097078

(51) Int. Cl.
B32B 3/00 (2006.01)
C09D 133/02 (2006.01)

(52) U.S. Cl.
CPC .............. C09D 133/02 (2013.01); B32B 3/00 (2013.01)

(58) Field of Classification Search
CPC ........ B32B 3/00; C09D 133/08; C09D 133/10
See application file for complete search history.

(56) References Cited

U.S. PATENT DOCUMENTS

2012/0100380 A1 4/2012 Groenewolt
2019/0077134 A1* 3/2019 Konno .................... B32B 25/06
(Continued)

FOREIGN PATENT DOCUMENTS

EP 1736515 A1 12/2006
EP 3486292 A1 5/2019
(Continued)

OTHER PUBLICATIONS

International Search Report for PCT/EP2023/063559 dated Aug. 22, 2023, 4 pages.
(Continued)

*Primary Examiner* — Elizabeth E Mulvaney
(74) *Attorney, Agent, or Firm* — Armstrong Teasdale LLP

(57) ABSTRACT

Disclosed herein is a topcoat layer (A) having a total elongation and pencil hardness in a specific range in the temperature range of from 20 to 120° C., which is formed by applying a coating of coating material (D) including essential components acrylic polymer (B), which includes a hydroxyl group and has a glass transition temperature of a specific range; polyisocyanate (C); and a solvent. Further disclosed herein are a lamination film (H) where the topcoat is laminated over a base material, and a decorative article (I) decorated by the lamination film.

12 Claims, 2 Drawing Sheets

(56) References Cited

U.S. PATENT DOCUMENTS

| | | | | |
|---|---|---|---|---|
| 2020/0086613 A1 | 3/2020 | Saito et al. | | |
| 2021/0162724 A1 | 6/2021 | Ono | | |
| 2023/0392035 A1* | 12/2023 | Furuya | ............. | C08F 220/1804 |
| 2023/0407129 A1* | 12/2023 | Furuya | .............. | C08G 18/4063 |
| 2024/0309239 A1* | 9/2024 | Watanabe | ............ | C08G 18/755 |
| 2025/0109313 A1* | 4/2025 | Horii | ................... | C08G 18/792 |

FOREIGN PATENT DOCUMENTS

| | | |
|---|---|---|
| JP | 202117507 A | 2/2021 |
| JP | 202120412 A | 2/2021 |

OTHER PUBLICATIONS

Written Opnion for PCT/EP2023/063559 dated Aug. 22, 2023, 6 pages.

* cited by examiner

[Figure 1]
(H1)
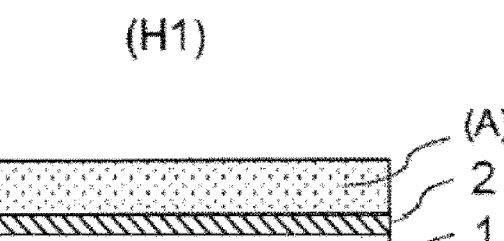
[Figure 2]
(H2)
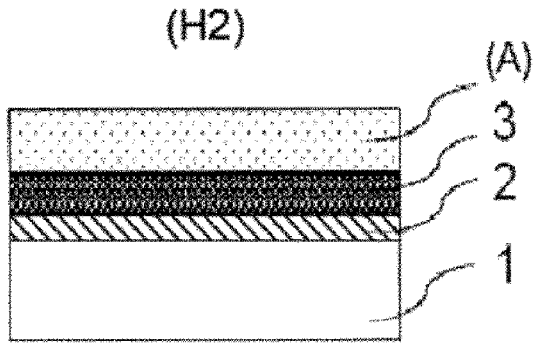
[Figure 3]
(H3)
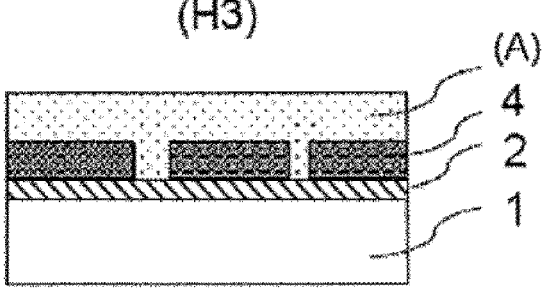

[Figure 4]
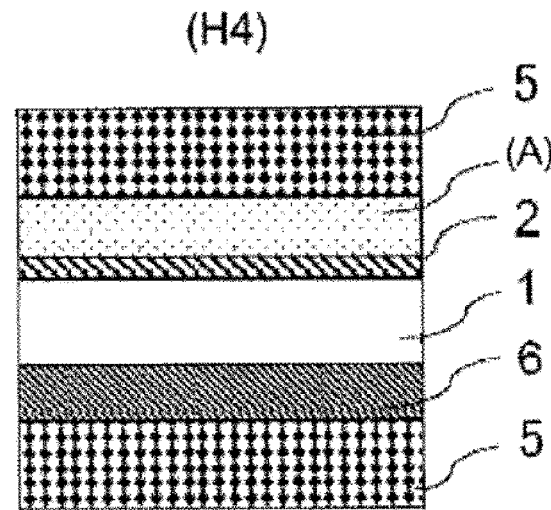
(H4)
5
(A)
2
1
6
5
[Figure 5]
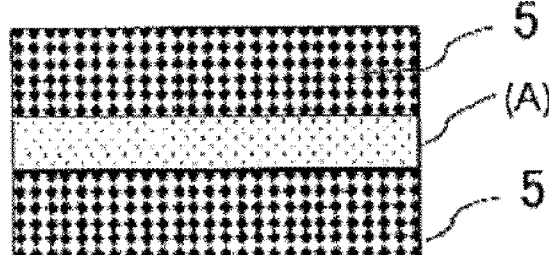
(H5)
5
(A)
5

TOPCOAT LAYER, A LAMINATION FILM CONTAINING THE SAME, AND A DECORATIVE ARTICLE DECORATED BY SAID LAMINATION FILM

CROSS-REFERENCE TO RELATED APPLICATIONS

This application is a U.S. National Phase Application of International Patent Application No. PCT/EP23/63559, filed May 22, 2023, which claims priority to Japanese Patent Application No.2022-097078, filed Jun. 16, 2022, each of which are hereby incorporated by reference herein.

TECHNICAL FIELD

The present invention relates to a topcoat layer, a lamination film containing the same, and a decorative article decorated by the lamination film.

BACKGROUND OF THE INVENTION

In recent years, alternative technologies for advanced design coatings have garnered interest from the standpoints of VOC (Volatile Organic Compound) control, workability, and providing functionality. Typical examples of decorative technologies that replace conventional methods include the application of decorative films to automotive exteriors and parts, colored plastic molded articles by using molded-in color, and the like, and practical applications have begun in part.

There are alternative coating technology methods for obtaining a plastic decorated article from a decorative film comprising a base material and one or multiple decorative layers. Generally, an injection molding machine is used with these methods.

Specifically, a film-comprising base material and a decorative layer are set into a mold in advance. Subsequently, molten resin is poured into the mold using an injection molding machine to obtain a molded article. The method of leaving both the base material and decorative layer in a decorative article like this is called in-mold forming (IMF). On the other hand, the method of leaving only a decorative layer in a decorative article by setting film into a mold in same manner described above, but separating the base material from the decorative layer and subsequently pouring molten resin into the mold is called in-mold release (IMR). In addition, there is also TOM (three dimensional overlay) forming, which is not limited to plastics, wherein film is overlaid by vacuum forming onto a previously finished article.

When obtaining a decorative component that contains a decorative film comprising a base material and one or multiple decorative layers by in-mold forming, it is necessary that the topcoat layer, which is the exterior layer of the decoration layer and the outermost layer on the decorative article, has the formability to deform to match the film surface profile. Because large tensile forces arise in parts of the topcoat layer when the base material is deformed, there is a concern that fractures and the like may be produced in the topcoat due to the tensile forces, which may affect the external appearance or resistance properties (chemical resistance, weather resistance) of the decorative article.

As examples of conventional technology for decorative films, Patent Document 1 discloses a laminate film for three-dimensional molding decoration having a base material film layer, a clear coating film layer, and a design layer, and the clear coating film layer is a layer formed of an active energy ray curable coating composition.

Patent Document 2 discloses a conductive composition that includes a formed film having a decorative layer and conductive layer over a base film, and a polyrotaxane compound used for the formed film.

Patent Document 3 discloses a decorative film that is used for decorating a three-dimensionally molded article, wherein the decorative film comprises at least a base material film layer and a clear layer, and the clear layer includes a fluorine-containing polymer.

PRIOR ART DOCUMENTS

Patent Documents

Patent Document 1: JP 2021-20412
Patent Document 2: JP 2021-17507
Patent Document 3: WO2018-216741

SUMMARY OF THE INVENTION

Problems to be Solved by the Invention

In Patent Document 1, however, since an active energy ray curable coating composition is used in the clear coating film layer, active energy ray irradiation equipment is required, and functional groups remaining after the reaction may effect the molded article. In Patent Document 2, polyrotaxane is a type of necklace-shaped slide-ring polymer consisting of straight-chain polyethylene glycol and multiple ring-shaped cyclodextrin molecules, however, due to the hydrophilic nature of polyethylene glycol, a film containing such has the potential for greatly reduced water resistance. Furthermore, the fluorine-containing polymer of the raw material in Patent Document 3 is expensive, and its application to automotive parts is difficult particularly from a cost standpoint.

In view of the aforementioned conventional technologies, the object of the present invention is to provide a topcoat layer having superior external appearance, moldability, chemical resistance, water resistance, and weather resistance, a lamination film containing the same, and a decorative part decorated by the lamination film.

Means for Solving the Problem

As a result of diligent investigation to solve the aforementioned problem, the inventors discovered a solution to the aforementioned problem and completed the present invention by means of a topcoat layer (A) having a total elongation and pencil hardness in a specific range in the temperature range of 20 to 120° C., which was formed by applying a coating of coating material (D) comprising essential components acrylic polymer (B), which includes a hydroxyl group and has a glass transition temperature of a specific range; polyisocyanate (C); and a solvent, a lamination film (H), wherein the aforementioned topcoat is laminated over a base material, and a decorative article (I) decorated by the aforementioned lamination film.

Specifically, the aforementioned problem of the present invention was solved by

<1> A topcoat layer (A) satisfying below conditions (1) to (3), specifically topcoat layer (A): is formed by applying a coating of coating material (D) comprising essential components acrylic polymer (B), which includes a hydroxyl group and has a glass transition temperature of −50° C. to 30° C.; polyisocyanate (C); and a solvent,
has a total elongation of 3% or greater in the temperature range of 20 to 120° C., and
has a pencil hardness of 6B or higher measured in accordance with ISO 15184.

<2> The hydroxyl value in aforementioned acrylic polymer (B) is preferably 80 to 220 mg KOH/g.

<3> The aforementioned polyisocyanate (C) is preferably an aliphatic polyisocyanate.

<4> The aforementioned polyisocyanate (C) is preferably one or more species selected from a group consisting of a biuret, isocyanurate, adduct, uretdione, and allophanate of a compound having two or more isocyanate groups within the molecule.

<5> The aforementioned coating material (D) preferably includes one or more species selected from polyurethane elastomers (E) or polyesters (F).

<6> The content ratio of the isocyanate group in aforementioned polyisocyanate (C) to the hydroxyl group in aforementioned acrylic polymer (B) expressed as the NCO/OH mole ratio is preferably 0.5 to 1.7.

<7> Aforementioned coating material (D) preferably includes hindered amine-based light stabilizer (G).

In addition, the aforementioned problem of the present invention was solved by

<8> A lamination film (H) formed by laminating the aforementioned top coat layer (A) onto a base material.

<9> Lamination film (H) of the present invention can have a print layer between the aforementioned base material and aforementioned topcoat layer (A).

<10> Lamination film (H) of the present invention preferably has a total elongation of 5% or greater in the temperature range of 60 to 120° C.

<11> The aforementioned base material is preferably polypropylene.

<12> Lamination film (H) of the present invention can be formed by additionally laminating a release layer onto the aforementioned topcoat layer (A).

Additionally, the aforementioned problem of the present invention was solved by

<13> Decorative article (I) decorated by aforementioned lamination film (H).

Effect of the Invention

According to the present invention, a topcoat layer having excellent external appearance, moldability, chemical resistance, water resistance, and weather resistance, a lamination film including the same, and a decorative article decorated by the lamination film can be obtained.

BRIEF DESCRIPTION OF THE DRAWINGS

FIG. 1 is cross section presenting an embodiment (Embodiment 1) of lamination film (H) of the present invention.

FIG. 2 is cross section presenting an embodiment (Embodiment 2) of lamination film (H) of the present invention.

FIG. 3 is cross section presenting an embodiment (Embodiment 3) of lamination film (H) of the present invention.

FIG. 4 is cross section presenting an embodiment (Embodiment 4) of lamination film (H) of the present invention.

FIG. 5 is cross section presenting an embodiment (Embodiment 5) of lamination film (H) of the present invention.

MODE FOR CARRYING OUT THE INVENTION

[Topcoat Layer (A)]

Topcoat layer (A) of the present invention refers to one layer of a lamination film comprising multiple layers with the object of applying decoration to an article, and that is the outermost layer on an article that has been decorated by this film.

By satisfying the below conditions (1) to (3), topcoat layer (A) will have good moldability, and in addition, decorative article (I), which is decorated by lamination film (H) in which topcoat layer (A) is laminated onto an arbitrary base material surface, will have excellent external appearance, chemical resistance, water resistance, and weather resistance.

[Conditions (1) to (3)]:

(1) Is formed by applying a coating of coating material (D) comprising essential components acrylic polymer (B), which includes a hydroxyl group and has a glass transition temperature of −50° C. to 30° C.; polyisocyanate (C); and a solvent.

(2) Has a total elongation of 3% or greater in the temperature range of 20 to 120° C.

(3) Has a pencil hardness of 6B or higher measured in accordance with ISO 15184.

[Total Elongation of Topcoat Layer (A)]

In the present invention, "total elongation of 3% or greater in the temperature range of 20 to 120° C." for topcoat layer (A) indicates a 3% or greater total elongation at any temperature within the 20 to 120° C. temperature range and means that sufficient stretchability is obtained when the layer is formed at that temperature. By having total elongation of 3% or greater in the 20 to 120° C. temperature range, fractures will not occur in topcoat layer (A) when it is stretched, and a good external appearance of the molded article is maintained.

The desired range of total elongation of topcoat material (A) can be achieved by adjusting the glass transition temperature or hydroxyl value of acrylic polymer (B), or the NCO/OH mole ratio, which is the mixture ratio of acrylic polymer (B) and polyisocyanate (C).

To measure total elongation, a free film of topcoat layer (A) was prepared with dimensions of initial length (L0)=30 mm, width=10 mm, and film thickness 30 μm, and the measurement was performed with tension speed of 5 mm/min within the temperature range of 20 to 120° C. using an Autoclave AG-IS (trade name) manufactured by Shimadzu Corporation. The length (L) at the point at which topcoat layer (A) broke was measured, and total elongation was determined by the following formula.

$$\text{Total elongation (\%)} = (L - L0)/L0 \times 100$$

[Pencil Hardness of Topcoat Layer (A)]

Topcoat layer (A) in the present invention is to have a pencil hardness of 6B or higher as measured in accordance with ISO 15184. Thereby, topcoat layer (A) obtains sufficient hardness and improved chemical resistance. A topcoat layer (A) pencil hardness of 4B or higher is particularly preferable.

The desired range for pencil hardness of topcoat layer (A) can be achieved by adjusting the glass transition temperature, mass average molecular weight (Mw), or hydroxyl value of acrylic polymer (B), or the NCO/OH mole ratio, which is the mixture ratio of acrylic polymer (B) and polyisocyanate (C).

[Coating Material (D)]

Coating material (D) of the present invention comprises acrylic polymer (B), which includes a hydroxyl group and has a glass transition temperature of −50° C. to 30° C.; polyisocyanate (C); and a solvent as essential components.

Because of the fact that coating material (D) contains acrylic polymer (B), which includes a hydroxyl group and has a glass transition temperature of −50° C. to 30° C., and polyisocyanate (C), the total elongation and pencil hardness of topcoat layer (A) can both be achieved, and the external appearance, formability, chemical resistance, water resistance, and weather resistance can be satisfactory at the same time. Crosslinking by bonding of the hydroxyl group of acrylic polymer (B) with polyisocyanate (C) can further increase chemical resistance, water resistance, and weather resistance. In addition, the density and wettability to the base material of coating material (D) can be suitably controlled by including a solvent.

[Viscosity of Coating Material (D)]

In the present invention, while the viscosity of coating material (D) may depend on the method for forming the coating film, it is preferable to adjust the viscosity with a solvent to 50 mPa·s to 5000 mPa·s at 23° C., and it is more preferable to adjust viscosity to 300 mPa·s to 3000 mPa·s. By making the viscosity 50 mPa's or higher, it is possible to secure a sufficient film thickness, and workability is considered satisfactory. By making the viscosity 5000 mPa·s or lower, a coating film is formed with no air remaining within topcoat layer (A) and with no blistering or the like occurring during molding.

[Acrylic Polymer (B)]

The glass transition temperature of acrylic polymer (B) is preferably −50 to 30° C., more preferably −45 to 25° C., and still more preferably −40 to 20° C. The chemical resistance obtained by a sufficient pencil hardness for topcoat layer (A) is ensured by making the glass transition temperature −50° C. or higher, and topcoat layer (A) can attain total elongation in the object range and good moldability by making the transition temperature 30° C. or lower.

Here, the class transition temperature is the value calculated from the formula presented below.

$$1/Tg = \sum \left( W_i/Tg_i \right)$$

Tg: Glass transition temperature of copolymer (absolute temperature)

$W_i$: Mass fraction of monomer component i $Tg_i$: Glass transition temperature of homopolymer of monomer component i (absolute temperature)

[Monomers that Constitute Acrylic Polymer (B)]

In the present invention, acrylic polymer (B) can be made as a copolymer of a hydroxyl group containing monomer (a) and another monomer (c). A copolymer of a hydroxyl group-containing monomer (a), a carboxyl group-containing monomer (b), and other monomer (c) is preferable.

[Hydroxyl Group-Containing Monomer (a)]

A monomer containing a hydroxyl group and a radical polymerizable unsaturated bond can be used as hydroxyl group-containing monomer (a). The hydroxyl group acts as a functional group that reacts mainly with polyisocyanate (C).

The hydroxyl group containing monomer (a) includes 2-hydroxyethyl acrylate (HEA), 2-hydroxyethyl methacrylate (HEMA), 2-hydroxy propyl acrylate (HPA), 2-hydroxypropyl methacrylate (HPMA), 4-hydroxybutyl acrylate (4-HBA), glycerol monomethacrylate (Blemmer GLM and Blemmer GLM-R (trade names) (chlorine free type) made by NOF Corporation), and the like.

These hydroxyl group-containing monomers (a) can be used individually, or two or more can be used.

[Carboxyl Group-Containing Monomer (b)]

A monomer containing a carboxyl group and a radical polymerizable unsaturated bond can be used as carboxyl group-containing monomer (b). The carboxyl group-containing monomer (b) includes acrylate, methacrylate, 2-(methacryloyloxy)ethyl succinate, and the like.

These carboxyl group-containing monomers (b) can be used individually, or two or more can be used.

[Other Monomer (c)]

The other monomer (c) is not particularly limited provided it is a monomer containing a radical polymerizable unsaturated bond, and it is appropriately selected based on compatibility with the other components within coating material (D). It is preferable to use a monomer for other monomer (c) that has good copolymerizability with hydroxyl group-containing monomer (a) and carboxyl group-containing monomer (b).

Specific examples of other monomer (c) are enumerated in (1) to (8) below.

(1) Monoester monomers of acrylic acid or methacrylic acid and 1 to 20C monohydric alcohol: examples include methyl acrylate, methyl methacrylate, ethyl acrylate, ethyl methacrylate, propyl acrylate, propyl methacrylate, butyl acrylate, butyl methacrylate, 2-ethylhexyl acrylate, 2-ethylheyxl methacrylate, cyclohexyl acrylate, cyclohexyl methacrylate, lauryl acrylate, lauryl methacrylate, and the like.

(2) Aromatic vinyl monomers: examples include styrene, α-methyl styrene, vinyltoluene, and the like.

(3) Glycidyl group-containing vinyl monomers: compounds that contains a glycidyl group and a radical polymerizable unsaturated bond within a single molecule, specifically, glycidyl acrylate, glycidyl methacrylate, and the like.

(4) Nitrogen-containing alkyl (1 to 20C alkyl groups) (meth) acrylates: examples include dimethylaminoethyl acrylate, dimethylaminoethyl methacrylate, etc.

(5) Radical polymerizable unsaturated bond-containing amide-based monomers: examples include, acrylamide, methacrylamide, N,N-dimethyl acrylamide, N,N-dimethyl methacrylamide, N-butoxymethyl acrylamide, N-methylol acrylamide, N-methylol methacrylamide, diacetone acrylamide, and the like.

(6) Aliphatic vinyl compounds: Examples include vinyl acetate, vinyl propionate, vinyl chloride, and the like.

(7) Radical polymerizable unsaturated bond-containing nitrile-based compounds: examples include acrylonitrile, methacrylonitrile, and the like.

(8) Diene-based compounds: examples include butadiene, isoprene, and the like.

Other monomers (c) can be used individually, or two or more can be used.

[Production of Acrylic Polymer (B)]

In the present invention, the production method for acrylic polymer (B) is not particularly limited, and for example, the polymer can be obtained by polymerizing the aforementioned polymers by a known radical polymerization reaction. While it is not a problem for the reaction to proceed in the absence of a solvent, from the standpoint of synthesis stability and handling, it is preferable to use a solvent.

Also, from the standpoint of controlling molecular weight, it is preferable to use a radical polymerization initiator (hereinafter, referred to as a "polymerization initiator"). In addition, known additives such as chain transfer agents may be used.

While not limited to the examples below, examples of solvents include acetone, methyl ethyl ketone, cyclohexanone, methyl acetate, ethyl acetate, propyl acetate, toluene, xylene, anisole, isopropanol, propylene glycol monomethyl ether, propylene glycol monoethyl ether, and the like. These solvents may be used individually or may be used as a combination of two or more.

In this instance, while the solid component content of acrylic polymer (B) does not impair synthesis stability and may be selected arbitrarily, the solid component content is generally 10 to 70 mass-%.

[Polymerization Initiators]

In the present invention, examples of polymerization initiators that can be used for acrylic polymer (B) include organic peroxides such as benzoyl peroxide, tert-butyl peroxybenzoate, cumene hydroperoxide or diisopropyl peroxydicarbonate, di-n-propyl peroxydicarbonate, di-(2-ethoxyethyl) peroxydicarbonate, tert-butylperoxy-2-ethyl hexanoate, tert-butyl peroxyneodecanoate, tert-butyl peroxypivalate, (3,5,5-trimethylhexanoyl) peroxide, dipropionyl peroxide, and diacetyl peroxide, azo-based compounds such as 2,2'-azobisisobutyronitrile, 2,2'-azobis(2-methylbutyronitrile), 1,1'-azobis(cyclohexane-1-carbonitrile), 2,2'-azobis(2,4-dimethylvaleronitrile), 2,2'-azobis(2,4-dimethyl-4-methoxyvaleronitrile), dimethyl-2,2'-azobis(2-methylpropionate), 4,4'-azobis(4-cyanovaleric acid), 2,2'-cyanobis(2-hydroxymethylpropionitrile), and 2,2'-azobis [2-(2-imidazoline-2-yl) propane]. These polymerization initiators may be used individually or may be used as a combination of two or more. It is preferable for the addition amount of polymerization initiator to be 0.1 to 20 parts by mass to 100 parts by mass of the total amount of hydroxyl group-containing monomer (a), carboxyl group-containing monomer (b), and other monomer (c).

[Chain Transfer Agents]

In the production of acrylic polymer (B), a chain transfer agent may be used with the object of controlling the molecular weight. Examples of chain transfer agents include thioglycerol, alkyl mercaptans such as octyl mercaptan, nonyl mercaptan, decyl mercaptan, and dodecyl mercaptan, thioglycolic acid esters such as octyl thioglycolate, nonyl thioglycolate, and 2-ethylhexyl thioglycolate, and 2,4-diphenyl-4-methyl-1-pentene, 1-methyl-4-isopropylidene-1-cyclohexane, α-pinene, 3-pinene, and the like.

When producing acrylic polymer (B), the method for addition of a solvent and a polymerization initiator is arbitrary, however, with the object of controlling the heat of polymerization and the heat of reaction, the preferred method is to charge an organic solvent solution into the reaction tank, and while providing agitation, to dropwise add a radical polymerizable monomer or the organic solvent solution from a dropping tank. The polymerization temperature for the aforementioned polymerization reaction varies with the type of polymerization initiator and whether or not a chain transfer agent is used at the same time, however, it is preferable to carry out the reaction under conditions of 50 to 200° C., and it is more preferable to carry out the reaction under conditions of 80 to 160° C. Because the 10-hour half-life temperature of many polymerization initiators is 50° C. or higher, using a polymerization temperature of 50° or higher can obtain the desired radical induced decomposition efficiency. On the other hand, making the polymerization temperature 200° C. or lower can reduce side reactions such as unexpected polymerization.

[Mass-Average Molecular Weight (Mw) of Acrylic Polymer (B)]

In the present invention, the mass-average molecular weight (Mw) of acrylic polymer (B) is preferable 1,000 to 50,000, more preferably 2,000 to 40,000, and particularly preferably 3,000 to 30,000. The chemical resistance obtained by having sufficient pencil hardness for topcoat layer (A) is ensured by making the mass-average molecular weight 1,000 or higher. Topcoat layer (A) will have good curing agent compatibility with a mass-average molecular weight of 50,000 or lower, and thereby, the coating film will have a good external appearance.

In the present invention, the mass-average molecular weight (Mw) was measured using gel permeation chromatography (HLC-8220, trade name, Tosoh Corporation). The calibration curve was prepared from a standard polystyrene sample. The eluent used was tetrahydrofuran, and TSKgel® G2000HXL, G3000HXL, G4000HXL and G5000HXL (trade names, Tosoh Corporation) columns were used in combination. Measurements were carried out under the conditions of flow rate 1.0 mL/min, injection volume 10 μL, column temperature 40° C.

[Hydroxyl Value of Acrylic Polymer (B)]

In the present invention, the hydroxyl value of acrylic polymer (B) is 80 to 220 mg KOH/g, preferably 100 to 210 mg KOH/g, and particularly preferably 120 to 200 mg KOH/g. When the hydroxyl value is 80 mg KOH/g or greater, topcoat layer (A) obtains sufficient pencil hardness, and chemical resistance is ensured. When the hydroxyl value is 220 mg KOH/g or lower, topcoat layer (A) can attain total elongation in the object range and have good moldability. In addition, curing agent compatibility is obtained which provides a good external appearance to topcoat layer (A). Here, the hydroxyl value is the hydroxyl value measured in accordance with JIS-K1557.

[Acid Value of Acrylic Polymer (B)]

In the present invention, the acid value of acrylic polymer (B) is 0 to 60 mg KOH/g, preferably 0 to 50 mg KOH/g, and particularly preferably 0 to 40 mg KOH/g. By having an acid value of acrylic polymer (B) within the aforementioned range, topcoat layer (A) can have good water resistance. Here, the acid value is the acid value measured in accordance with JIS-K5601.

[Polyisocyanate (C)]

In the present invention, a cured film is obtained for topcoat layer (A) having excellent coating film strength and flexibility by a cross-linking reaction of acrylic polymer (B) and polyisocyanate (C).

From the standpoint of weather resistance (light resistance, particularly non-yellowing), polyisocyanate (C) is preferably an aliphatic polyisocyanate compound.

In addition, from the standpoint of water resistance and chemical resistance, polyisocyanate (C) is preferably one or more species selected from a group consisting of a biuret, isocyanurate, adduct, uretdione, and allophanate of a compound having two or more isocyanate groups within the molecule.

Specific examples of polyisocyanate (C) are enumerated below.

Examples of commercially available polyisocyanate (C) mainly containing biuret include Desmodur N 75 (trade names, Sumika Covestro Urethane Co., Ltd.) and DURANATE 24A-100 and 22A-75P (trade names, Asahi Kasei Corporation), and the like.

Examples of commercially available polyisocyanate (C) mainly containing isocyanurate include Desmodur N 3600 and N 3300 (trade names, Sumika Covestro Urethane Co., Ltd.) and DURANATE TPA-100 and TKA-100 (trade names, Asahi Kasei Corporation), and the like.

Examples of commercially available polyisocyanate (C) mainly containing adduct include DURANATE E402-80B and E405-70B (trade names, Asahi Kasei Corporation), and the like Examples of commercially available polyisocyanate (C) mainly containing uretdione include Desmodur N 3400 (trade name, Sumika Covestro Urethane Co., Ltd.) and DURANATE TLA-100 and TUL-100 (trade names, Asahi Kasei Corporation), and the like.

Examples of commercially available polyisocyanate (C) mainly containing allophanate include DURANATE A201H, D101, and D201 (trade names, Asahi Kasei Corporation), and CORONATE 2793 and 2770 (trade names, Tosoh Corporation), and the like.

These polyisocyanates (C) may be used individually or may be used as a combination of two or more.

Material in which isocyanate groups have a block (blocked isocyanate) or material having no block can be used for polyisocyanate (C). However, from the standpoint of low-temperature curability for topcoat layer (A), use of a polyisocyanate (C) having no block is preferable. That is, the need arises for heating to a comparatively high temperature (for example, a temperature higher than 120° C.) if the isocyanate groups of polyisocyanate (C) are blocked, and because of this, use of unblocked isocyanates (C) is preferred so that deformations do not occur during curing of topcoat layer (A).

[NCO/OH Mole Ratio]

In the present invention, the content ratio of the isocyanate groups in polyisocyanate (C) to the hydroxyl groups in acrylic polymer (B) expressed as the NCO/OH mole ratio is preferably 0.5 to 1.7, and more preferably 0.8 to 1.3. When the NCO/OH mole ratio is 0.5 or greater, sufficient crosslinking density can be obtained, topcoat layer (A) pencil hardness and total elongation can reach the object range, and the chemical resistance and moldability are satisfactory. When the NCO/OH mole ratio is 1.7 or less, a coating film is obtained having excellent weather resistance.

[Catalyst]

In the present invention, coating material (D) may include a catalyst to promote the crosslinking reaction of acrylic polymer (B) and polyisocyanate (C). Known metal-based catalysts and amine-base catalysts can be used as the catalyst. Metal-based catalysts include dibutyltin dilaurate, tin octylate, dibutyltin di(2-ethylhexanoate), lead 2-ethylhexanoate, titanium 2-ethylhexanoate, titanium diisopropoxy bis(acetylacetonate), iron 2-ethylhexanoate, cobalt 2-ethylhexanoate, zinc naphthenate, cobalt naphthenate, tetra-n-butyltin, and the like. Amine-based catalysts include tertiary amines such as tetramethyl butanediamine. The blending quantity of these catalysts is preferably 0.001 to 1 part by mass to 100 parts by mass of coating material (D).

[Solvent]

In the present invention, coating material (D) contains a solvent as an essential component. Examples of solvents include alicyclic hydrocarbon-based solvents such as cyclohexane and ethyl cyclohexane, aromatic hydrocarbon-based solvents such as toluene, xylene, ethyl benzene, and aromatic naphtha, ketone-based solvents such as acetone, methyl ethyl ketone, methyl isobutyl ketone, cyclohexanone, and isophorone, ester-based solvents such as ethyl acetate, n-butyl acetate, isopropyl acetate, 3-methoxybutyl acetate, and bis(2-ethylhexyl) adipate, ether-based solvents such as dibutyl ether, tetrahydrofuran, 1,4-dioxane, and 1,3,5-trioxane, and nitrogen-based solvents such as acetonitrile, valeronitrile, N,N-dimethylformamide, and N,N-diethylformamide, and the like. The organic solvent may be one solvent species alone or may be a multi-species solvent mixture of two or more solvent species. The solvent is not particularly limited provided it can adjust the viscosity of coating material (D), is able to coat and form topcoat layer (A), and additionally, does not erode the base material. Also, the solvent boiling point is preferably under 250° C.

The solvent content within 100 parts by mass of coating material (D) of the present invention is preferably 10 to 90 parts by mass. Making the solvent content 10 parts by mass or higher enables wettability to the base material to be controlled, and making the solvent content 90 parts by mass or lower allows the film thickness of topcoat layer (A) to be adjusted.

In the present invention, coating material (D) can include one or more species selected from polyurethane elastomers (E) or polyesters (F). Adding one or more species selected from polyurethane elastomers (E) or polyesters (F) to coating material (D) can further improve the total elongation of topcoat layer (A) due to the plasticizing effect, and correspondingly more complex shapes can be accommodated.

[Polyurethane Elastomer (E)]

The content of polyurethane elastomer (E) within 100 parts by mass of coating material (D) is preferably 1 to 50 parts by mass, more preferably 3 to 40 parts by mass, and still more preferably 5 to 30 parts by mass. When the content of polyurethane elastomer (E) is 1 to 50 parts by mass, excellent moldability, chemical resistance, and water resistance can be obtained.

Commercial products for polyurethane elastomer (E) include Elastollan ET890, CD64-D, and C85A (trade names, BASF), and the like. These polyurethane elastomers (E) can be used individually, or two or more can be used.

[Polyester (F)]

In the present invention, coating material (D) can include polyester (F). This polyester (F) preferably contains a hydroxyl group. The chemical resistance and water resistance of topcoat layer (A) is improved by a cross-linking reaction of the polyester (F) hydroxyl group and polyisocyanate (C).

The content of polyester (F) within 100 parts by mass of coating material (D) is preferably 3 to 50 parts by mass, more preferably 6 to 40 parts by mass, and still more preferably 10 to 30 parts by mass. When the content of polyester (F) is 3 to 50 parts by mass, excellent moldability, chemical resistance, and water resistance can be obtained.

Polyester (F) can be produced by the usual method, for example, by an esterification reaction of polybasic acid and polyhydric alcohol. The polybasic acid is a compound having two or more carboxyl groups within a single molecule, and examples include phthalic acid, isophthalic acid, terephthalic acid, succinic acid, adipic acid, azelaic acid, sebacic acid, tetrahydrophthalic acid, hexahydrophthalic acid, maleic acid, fumaric acid, itaconic acid, trimellitic acid, pyromellitic acid, and anhydrides thereof, and the like. The polyhydric alcohol is a compound having two or more hydroxyl groups within a single molecule, and examples include diols such as ethylene glycol, propylene glycol, 1,3-propanediol, 1,4-butanediol, 1,5-pentanediol, 1,6-hexanediol, 2,2-diethyl-1,3-propanediol, neopentyl glycol, 1,9-nonanediol, 1,4-cyclohexanediol, hydroxypivalic acid neopentyl glycol ester, 2-butyl-2-ethyl-1,3-propanediol, 3-methyl-1,5-pentanediol, 2,2,4-trimethyl pentanediol, and hydrogenated bisphenol A, and polyol components having a valence of three or higher such as trimethylolpropane, trimethylol ethane, glycerin, and pentaerythritol, and hydroxy carboxylic acids such as 2,2-dimethylol propionic acid, 2,2-dimethylol butanoic acid, 2,2-dimethylol pentanoic acid, 2,2-dimethylol hexanoic acid, and 2,2-dimethylol octanoic acid, and the like.

Commercial products for polyester (F) include D620, D623, D643, and D645 (trade names, Mitsubishi Chemical Corporation) and the ADK CYCLOAID PNB series (trade names, ADEKA Corporation), and the like.

In addition, commercial products for hydroxyl group-containing polyester (F) include K-FLEX 188, 171-90, A307, A308, and UD-320-100 (trade names, King Industries, Inc.) and Desmophen C 1200 and 3601 (trade names, Covestro AG), and the like.

The hydroxyl value for hydroxyl group-containing polyester (F) is preferably in the range of 10 to 300 mg KOH/g, and more preferably in the range of 10 to 250 mg KOH/g.

The mass-average molecular weight (Mw) of polyester (F) is preferably in the range of 500 to 30,000.

These polyesters (F) can be used individually, or two or more can be used.

[Hindered Amine-Based Light Stabilizer (G)]

In the present invention, coating material (D) can include hindered amine-based light stabilizer (G) and is preferably used in combination with ultraviolet absorbing agent (J). As the outermost surface layer on exterior parts or other such coated objects on automobiles or the like, topcoat layer (A) of the present invention may be exposed for long periods of time to all the changes in weather outdoors. However, by using ultraviolet absorbing agent (J) in combination with hindered amine-based light stabilizer (G) as described above, it is possible to keep the coating close to the condition at the time of delivery for 10 years or more.

A particularly preferable example is the addition of a triazine-based ultraviolet absorbing agent (J) and an NOR-type hindered amine-based light stabilizer (G) to coating material (D).

Commercially available triazine-based ultraviolet absorbing agent (J) include, for example, Eversorb® 40, Eversorb 41 FD, and Eversorb 45 (trade names, Everlight Chemical), Tinuvin 1600 and Tinuvin 1577 ED (trade names, BASF), and the like. These triazine-based ultraviolet absorbing agents (J) can be used individually, or two or more can be used.

Commercially available NOR-type hindered amine-based light stabilizer (G) include Eversorb 93 Eversorb 90, and Eversorb 95 (trade names, Everlight Chemical) and Tinuvin 123, Tinuvin 144, Tinuvin 765, and Tinuvin 770 (trade names, BASF), and the like. These NOR-type hindered amine-based light stabilizers (G) can be used individually, or two or more can be used.

The content of ultraviolet absorbing agent (J) and hindered amine-based light stabilizer (G), respectively, within 100 parts by mass of coating material (D) is preferably 0.1 to 30 parts by mass, more preferably 0.1 to 25 parts by mass, and still more preferably 0.1 to 20 parts by mass. Excellent weather resistance can be obtained when the content of ultraviolet absorbing agent (J) and hindered amine-based light stabilizer (G), respectively, is 0.1 to 30 parts by mass.

[Other]

In the present invention, coating material (D) can be used just as it is, or it can be used with the addition of one or more of various additives, for example, antioxidants, surfactants, surface conditioners, antistatic agents, perfumes, or dehydrating agents, and additionally, rheology modifiers such as polyethylene waxes, polyamide waxes, and internally cross-linked resin fine particles, and the like.

Moreover, coating material (D) may be used as a clear coating material, or it may be blended with a coloring agent such as a dye or pigment, and then used as a colored coating material.

[Production of Coating Material (D)]

In the present invention, coating material (D) can be produced by known methods. As a specific example, acrylic polymer (B), which includes a hydroxyl group and has a glass transition temperature of −50° C. to 30° C., polyisocyanate (C), and a solvent are sequentially added so as to provide the desired coating material properties. After mixing sufficiently, coarse particle are removed by filtering or other means to obtain coating material (D).

[Production of Topcoat Layer (a)]

In the present invention, topcoat layer (A) is produced by applying coating material (D) onto a base material. While the method for applying coating material (D) onto a base material is not particularly limited, examples of known methods include the bar coating method, knife coating method, roll coating method, plate coating method, die coating method, gravure coating method, curtain coating method, spray coating method, and the like. Then, baking evaporates away the solvent and promotes the cross-linking reaction to obtain topcoat layer (A).

[Base Material]

In the present invention, the base material to which coating material (D) is applied is not particularly restricted.

Specifically, this includes one or more resins selected from the group consisting of (meth) acrylic resin, styrene-based resin, polycarbonate-based resin, polyolefin-based resin, polyvinyl chloride, polyester, polyvinyl acetate, vinyl acetate copolymer, styrene-methylmethacrylate copolymer, acrylonitrile-styrene copolymer, acrylonitrile-butadiene-styrene copolymer, nylon, polymethylpentene, silicone resin, amino resin, polysulfone, polyethersulfone, polyetherimide, fluororesin, and polyimide resin materials, and in addition, includes dust-free paper, glass base material, porous ceramic base material, cellulose base material, and the like. The form of the base material is not particularly restricted, however, sheet form, plate form, and the like are preferred. From the standpoint of moldability, a base material that is polypropylene film is particularly preferable.

The thickness of the base material is commonly 50 to 1000 μm, and preferably about 100 to 1000 μm. If the thickness of the base material is less than 50 μm, handling ability is likely to decline.

Because the base material film may undergo heat loading during molding, it is preferable for the base material to be heat resistant. Cracks in topcoat layer (A) tend not to form because the deformation of the base material is thereby reduced, and because the adhered state (adhesive force) with topcoat layer (A) adjacently laminated onto the base layer can be preferably maintained. As to heat resistance in the present invention, if no deformation is observed 5 seconds after inserting base material into a 120° C. oven, substantially no deformations should be observed.

In addition, these base materials may be surface pretreated in advance, and the coating film may be formed onto a surface in advance. That is, in addition to physical treatments such as corona treatment, flame treatment, and plasma treatment of the base material surface, an easy adhesion treatment that lays down a layer of a primer such as chlorinated olefin, polyester, or urethane can be performed. Performing these treatments improves the adhesive strength of the base material to the adjacent layer.

The thickness of the primer layer material is commonly 1 to 100 μm, and preferably about 1 to 20 μm. If the thickness of the primer layer is greater than 100 μm, weather resistance is likely to decline.

[Lamination Film (H)]

The lamination film (H) of the present invention can take five forms as presented in the examples below. The descriptions presented make reference to the drawings.

Embodiment 1

Lamination film (H1) in Embodiment 1 as shown in FIG. 1 is a lamination film (H1) in which primer layer 2 and topcoat layer (A) were successively formed onto base material 1. The method for producing lamination film (H1) in Embodiment 1, for example, includes laying down primer layer 2 onto base material 1, and additionally, applying coating material (D), which was prepared in advance by diluting the required arbitrary component mixture of acrylic polymer (B), polyisocyanate (C), and a solvent, onto primer layer 2 to provide topcoat layer (A), thereby forming lamination film (H1).

Embodiment 2

Lamination film (H2) in Embodiment 2 as shown in FIG. 2 is a lamination film (H2) in which primer layer 2, printed layer 3, and topcoat layer (A) were successively formed onto base material 1. The method for producing lamination film (H2) in Embodiment 2, for example, includes laying down primer layer 2 and printed layer 3 onto base material 1, and additionally, applying coating material (D), which was prepared in advance by diluting the required arbitrary component mixture of acrylic polymer (B), polyisocyanate (C), and a solvent, onto printed layer 3 to provide topcoat layer (A), thereby forming lamination film (H2).

Embodiment 3

Lamination film (H3) in Embodiment 3 of the present invention as shown in FIG. 3 is a lamination in which primer layer 2 and printing pattern layer 4 were coated onto base material 1, and subsequently, topcoat layer (A) was additionally laminated. The method for producing lamination film (H3) in Embodiment 3, for example, includes laying down primer layer 2 and printing pattern layer 4 onto base material 1, and additionally, applying coating material (D), which was prepared in advance by diluting the required arbitrary component mixture of acrylic polymer (B), polyisocyanate (C), and a solvent, onto primer layer 2 on which printing pattern layer 4 was emplaced to provide topcoat layer (A), thereby forming lamination film (H3).

Embodiment 4

Lamination film (H4) in Embodiment 4 of the present invention as shown in FIG. 4 is a lamination film (H4) which was formed by coating the back surface of base material 1 of lamination film (H1) or (H2) in Embodiment 1 or Embodiment 2 with adhesive layer 6, and subsequently, covering topcoat layer (A) and adhesive layer 6 with release layer 5.

Embodiment 5

Lamination film (H5) in Embodiment 5 of the present invention as shown in FIG. 5 is a lamination in which release layer 5 is used in place of base material 1. Lamination film (H5) was formed by coating the top of release layer 5 with coating material (D), which was prepared in advance by diluting the required arbitrary component mixture as of acrylic polymer (B), polyisocyanate (C), and a solvent, and additionally, covering the top of topcoat layer (A) with release layer 5.

Details of the printed layer, printing pattern layer, and release layer used in the aforementioned five embodiments are as follows.

[Printed Layer and Printing Pattern Layer]

The printed layer or the printing pattern layer can be formed by using metal or ink. When using metal, the specified pattern can be formed by using a vapor deposition or sputtering patterning process or the like. When using ink, a printed layer or printing pattern layer can be formed on the base material film by printing methods such as gravure printing, flexographic printing, screen printing, or sublimation thermal transfer, for example.

[Release Layer]

There is no particular restriction for the release layer, and a known release film can be used. Examples of what may be used as a separation layer are films such as polyester, polyvinyl chloride, polyvinylidene chloride, and polyethylene terephthalate, paper such as fine paper and glassine paper, or a laminate film of fine paper or glassine paper and polyolefin, and the like which have undergone release treatment by the application of silicone resin, fluororesin, or the like to the contact surface with topcoat layer (A). The thickness of the release layer is commonly 10 to 200 μm and preferably 25 to 100 μm.

The peel strength for the release layer and topcoat layer (A) is preferably 0.05 to 8.0 N/25 mm, and more preferably 0.1 to 5.0 N/25 mm. When the peel strength is 0.05 N/25 mm or greater, the release layer does not separate from topcoat layer (A) during production of the laminate film (H), during decoration molding, and like, and moldability improves. By having a peel strength of 8.0 N/25 mm or less, the release layer peels off smoothly when removing it after decorative molding.

The peel strength for the release layer and topcoat layer (A) was measured in accordance with the 180° peel bond strength test for adhesives of JIS K6854.

[Adhesive Layer]

An adhesive layer can be applied to the back surface of the base material. The resin component used in the adhesive layer is not particularly restricted provided that it can adhere to the base material and the decorative article, and polyurethane resin, polyester resin, polyvinyl acetate resin, epoxy resin, and the like can be used. These resin components may be used individually, or a mixture of multiple resin components may be used.

[Total Elongation of Lamination Film (H)]

In the present invention, "total elongation of 5% or greater in the temperature range of 60 to 120° C." for lamination film (H) indicates a 5% or greater total elongation at any temperature within the 60 to 120° C. temperature range and means that sufficient stretchability is obtained when formed at that temperature. When total elongation is 5% or greater in the 60 to 120° C. temperature range, fractures do not occur in topcoat layer (A) of lamination film (H) when stretched, and a good external appearance of the molded article is maintained. To measure total elongation, a sample of lamination film (H) was prepared with dimensions of initial length (L0)=30 mm and width=10 mm, and the measurement was performed with tension speed of 5 mm/min within the temperature range of 60 to 120° C. using an Autoclave AG-IS (trade name) manufactured by Shimadzu Corporation. The length (L) at the point at which either layer broke was measured, and total elongation was determined by the following formula.

$$\text{Total elongation } (\%) = (L - L0)/L0 \times 100$$

[Decorative Article (I)]

In the present invention, decorative article (I) is not particularly restricted, and examples of the present invention of articles decorated by the use of lamination film (H) on the objects to be decorated include vehicle components such as automobile bodies, emblems, and vehicle exteriors and interiors; building material components such as wall-finishing materials, window glass, window frames, and bathroom wall-finishing materials; everyday articles such as tableware, toys, and musical instruments; home appliance components such as vacuum cleaner housings, television housings, and air conditioner housings; interior parts such as doors; ship components, and the like. Among these, decorative article (I) of the present invention can be suitably used to improve both the design and durability of automotive plastic components because of the superior chemical resistance, water resistance, and weather resistance based on the properties of lamination film (H).

EMBODIMENTS

The present invention is described below in further detail based on embodiments, however, the scope of rights of the invention should not be construed as being limited by the embodiments below. In the examples, unless otherwise specified, "part(s)" means "part(s) by mass", and "%" in connection with blending quantity and content denotes "% by mass". In addition, Mw denotes mass-average molecular weight, and Tg denotes glass transition temperature.

<Synthesis of Acrylic Polymer (B)>

Synthesis Example 1

While introducing nitrogen gas, 100 parts of MEK solvent was added into a four-neck flask equipped with a reflux condenser tube, dropping funnel, gas introduction pipe, stirring apparatus, and thermometer, and heated and stirred at 75° C. for 30 minutes. A mixture of monomers ST 2.0 parts, BA 20.0 parts, EHA 45.0 parts, HEA 15.0 parts, HPMA 17.0 parts, and AA 1.0 parts and polymerization initiator AIBN 1.0 parts was placed into the dropping funnel, and the mixture was dropwise added for 3 hours while maintaining an internal temperature of 75° C. Stirring was maintained for an additional 5 hours. After confirming the addition rate exceeded 98% by measurement of solid content, cooling was applied, and MEK was completely vaporized by a vacuum pump to obtain acrylic polymer (B-1).

Synthesis Examples 2 to 12

Except for changes to compositions and blending ratios in Table 1, the acrylic polymers (B-2) through (B-12) were obtained by the same production method as acrylic polymer (B-1).

TABLE 1

| Synthesis example | Acrylic polymer (B) | Monomer (c) | | | | | Monomer (a) | | | Monomer (b) | Total | Solvent MEK | AIBN | Tg (° C.) | OHV (mg KOH/g) | AV | Mw |
|---|---|---|---|---|---|---|---|---|---|---|---|---|---|---|---|---|---|
| | | ST | BMA | BA | EHA | MMA | HEA | HEMA | HPMA | AA | | | | | | | |
| Synthesis example 1 | B-1 | 2.0 | | 20.0 | 45.0 | | 15.0 | | 17.0 | 1.0 | 100 | 100 | 1.0 | −48.9 | 138.7 | 7.8 | 4600 |
| Synthesis example 2 | B-2 | 2.0 | 10.0 | 13.0 | 45.0 | | 14.0 | | 15.0 | 1.0 | 100 | 100 | 1.0 | −44.7 | 126.1 | 7.8 | 5800 |
| Synthesis example 3 | B-3 | 5.0 | 12.0 | 37.0 | 15.0 | | 30.0 | | | 1.0 | 100 | 100 | 1.0 | −35.9 | 145.0 | 7.8 | 8900 |
| Synthesis example 4 | B-4 | 14.0 | 5.0 | 25.0 | 23.5 | 5.0 | 16.0 | 11.0 | | 0.5 | 100 | 100 | 1.0 | −30.6 | 124.8 | 3.9 | 7800 |
| Synthesis example 5 | B-5 | 12.0 | 5.0 | 19.0 | 23.0 | 2.0 | 16.0 | 10.0 | 12.0 | 1.0 | 100 | 100 | 1.0 | −18.6 | 167.2 | 7.8 | 9500 |
| Synthesis example 6 | B-6 | 20.0 | 9.0 | 10.0 | 21.0 | 2.0 | 15.0 | 10.0 | 12.0 | 1.0 | 100 | 100 | 1.0 | −4.6 | 162.3 | 7.8 | 6000 |
| Synthesis example 7 | B-7 | 13.0 | 19.0 | 10.0 | 15.0 | 5.0 | | 35.0 | | 3.0 | 100 | 100 | 1.0 | 10.3 | 150.9 | 23.4 | 15000 |
| Synthesis example 8 | B-8 | 20.0 | 19.0 | | 15.0 | 5.0 | | 20.0 | 20.0 | 1.0 | 100 | 100 | 1.0 | 27.8 | 164.1 | 7.8 | 18000 |

TABLE 1-continued

| | | Production of acrylic polymer (B) | | | | | | | | | | | | | | |
|---|---|---|---|---|---|---|---|---|---|---|---|---|---|---|---|---|
| Syn-thesis exam-ple | Acryl-ic polymer | Monomer (c) | | | | | Monomer (a) | | | Mono-mer (b) | | Sol-vent | | Tg | OHV (mg | | |
| ple | (B) | ST | BMA | BA | EHA | MMA | HEA | HEMA | HPMA | AA | Total | MEK | AIBN | (° C.) | KOH/g) | AV | Mw |
| Syn-thesis exam-ple 9 | B-9 | 7.0 | 12.0 | 25.0 | 15.0 | | 40.0 | | | 1.0 | 100 | 100 | 1.0 | −29.9 | 193.4 | 7.8 | 5900 |
| Syn-thesis exam-ple 10 | B-10 | 17.0 | 31.0 | 20.0 | 20.0 | | 11.0 | | | 1.0 | 100 | 100 | 1.0 | −19.4 | 53.2 | 7.8 | 6800 |
| Syn-thesis exam-ple 11 | B-11 | | | | 89.0 | | 11.0 | | | | 100 | 100 | 1.0 | −79.2 | 53.2 | 0.0 | 35000 |
| Syn-thesis exam-ple 12 | B-12 | 25.0 | 25.0 | | | | | 50.0 | | | 100 | 100 | 1.0 | 55.1 | 215.6 | 0.0 | 2500 |

Values for each material indicate parts by mass.

The meaning of the abbreviations in Table 1 are presented below.

<Monomer (a)>:
  HEA: 2-hydroxyethyl acrylate
  HEMA: 2-hydroxyethyl methacrylate
  HPMA: 2-hydroxypropyl methacrylate
<Monomer (b)>:
  AA: Acrylic acid
<Monomer (c)>:
  ST: Styrene
  BMA: Butyl methacrylate
  BA: Butyl acrylate
  EHA: 2-ethylhexyl acrylate
  MMA: Methyl methacrylate
<Solvent>
  MEK: Methyl ethyl ketone
<Polymerization initiator>
  AIBN: 2,2-azobis(isobutyronitrile)

Practical Example 1

[Preparation of Coating Material (D-1)]
46.2 parts of acrylic polymer (B-1), 20.9 parts of polyiso-cyanate (C-4), 1 part of triazine-based ultraviolet absorbing agent (J-1), 1 part of hindered amine-based light stabilizer (G-1) and 0.01 parts of catalyst (dibutyltin dilaurate) were weighed and diluted to a solid content (called "coating NV") of 49 mass-% with a solvent (ethyl 3-ethoxypropionate (EEP)), and agitated in a shaker until sufficiently uniform. Subsequently, this was filtered with a membrane filter hav-ing 200 μm mesh opening to remove coarse particles and prepare coating material (D-1). The aforementioned material is described in Table 2.

[Practical Examples 2 to 19], [Comparative Examples 1 to 6]

[Preparation of Coating Materials (D-2) to (D-25)]
Coating materials (D-2) to (D-25) were prepared using the same method as Practical Example 1 by changing blending ratios as in Table 2.

TABLE 2

| | | | | Production of coating material (D) | | | | | | |
|---|---|---|---|---|---|---|---|---|---|---|
| | | | | Acrylic | | Polyisocyanate (C) | | Polyurethane elastomer (E)/ | | |
| | Topcoat | Coating | | polymer (B) | | NCO/OH | | Polyester(F) | | |
| Practical example | layer (A) | layer (D) | Vis-cosity | (B) | Parts by mass | (C) | mole ratio | Parts by mass | (E)/(F) | Parts by mass |
| Practical Example 1 | A-1 | D-1 | ◎ | B-1 | 46.5 | C-4 | 1.0 | 20.9 | — | 0 |
| Practical Example 2 | A-2 | D-2 | ◎ | B-2 | 49.0 | C-1 | 1.0 | 19.7 | — | 0 |
| Practical Example 3 | A-3 | D-3 | ◎ | B-3 | 52.0 | C-3 | 1.0 | 32.8 | — | 0 |
| Practical Example 4 | A-4 | D-4 | ◎ | B-4 | 50.0 | C-4 | 1.0 | 20.2 | — | 0 |
| Practical Example 5 | A-5 | D-5 | ◎ | B-5 | 62.0 | C-4 | 1.0 | 33.6 | — | 0 |
| Practical Example 6 | A-6 | D-6 | ◎ | B-6 | 95.0 | C-2 | 1.0 | 158.1 | — | 0 |

TABLE 2-continued

| Production of coating material (D) | | | | | | | | | | |
|---|---|---|---|---|---|---|---|---|---|---|
| Practical Example 7 | A-7 | D-7 | ◎ | B-7 | 50.0 | C-3 | 1.0 | 32.8 | — | 0 |
| Practical Example 8 | A-8 | D-8 | ◎ | B-8 | 50.0 | C-4 | 0.8 | 21.3 | — | 0 |
| Practical Example 9 | A-9 | D-9 | ◎ | B-9 | 50.0 | C-1 | 1.5 | 46.2 | — | 0 |
| Practical Example 10 | A-10 | D-10 | ◎ | B-10 | 50.0 | C-2 | 1.2 | 32.7 | — | 0 |
| Practical Example 11 | A-11 | D-11 | ◎ | B-5 | 40.0 | C-3 | 1.3 | 37.8 | F-1 | 10 |
| Practical Example 12 | A-12 | D-12 | ◎ | B-4 | 51.0 | C-4 | 1.7 | 35.1 | F-1 | 30 |
| Practical Example 13 | A-13 | D-13 | ◎ | B-5 | 52.0 | C-1 | 1.7 | 23.5 | F-2 | 50 |
| Practical Example 14 | A-14 | D-14 | ◎ | B-4 | 52.0 | C-2 | 1.0 | 48.2 | E-1 | 50 |
| Practical Example 15 | A-15 | D-15 | ◎ | B-4 | 50.0 | C-3 | 0.8 | 21.7 | — | 0 |
| Practical Example 16 | A-16 | D-16 | ◎ | B-5 | 50.0 | C-4 | 1.7 | 46.1 | — | 0 |
| Practical Example 17 | A-17 | D-17 | ◎ | B-8 | 50.0 | C-1 | 1.8 | 47.1 | — | 0 |
| Practical Example 18 | A-18 | D-18 | ◎ | B-8 | 50.0 | C-4 | 0.5 | 13.3 | — | 0 |
| Practical Example 19 | A-19 | D-19 | ◎ | B-1 | 50.0 | C-1 | 0.7 | 15.5 | — | 0 |
| Comparative Example 1 | A-20 | D-20 | ◎ | B-11 | 50.0 | C-3 | 1.0 | 11.6 | — | 0 |
| Comparative Example 2 | A-21 | D-21 | ◎ | B-12 | 50.0 | C-2 | 1.0 | 110.6 | — | 0 |
| Comparative Example 3 | A-22 | D-22 | ◎ | B-11 | 50.0 | C-2 | 2.0 | 54.6 | — | 0 |
| Comparative Example 4 | A-23 | D-23 | ◎ | B-12 | 50.0 | C-4 | 0.5 | 17.5 | — | 0 |
| Comparative Example 5 | A-24 | D-24 | ◎ | B-1 | 102.0 | — | 0.0 | 0.0 | — | 0 |
| Comparative Example 6 | A-25 | D-25 | ◎ | B-11 | 50.0 | C-3 | 0.2 | 6.31 | — | 0 |

| | Solvent | | Ultraviolet absorbing agent (J)/ Light stabilizer (G) | | | | |
| | | | Triazine-based ultraviolet | Hindered amine-based | | | |
| Practical example | Solvent | Parts by mass | absorbing agent (J) | light stabilizer (G) | Catalyst | Total | Coating NV % |
|---|---|---|---|---|---|---|---|
| Practical Example 1 | EEP | 73.0 | J-1 1.0 | G-1 1.0 | 0.01 | 142 | 49% |
| Practical Example 2 | EEP | 73.0 | J-1 1.0 | G-1 1.0 | 0.01 | 144 | 49% |
| Practical Example 3 | EEP | 85.0 | J-1 1.0 | G-1 1.0 | 0.01 | 172 | 49% |
| Practical Example 4 | EEP | 76.0 | J-1 1.0 | G-1 1.0 | 0.01 | 148 | 49% |
| Practical Example 5 | EEP | 66.0 | J-1 1.0 | G-1 1.0 | 0.01 | 164 | 49% |
| Practical Example 6 | EEP | 100.0 | J-1 1.0 | G-1 1.0 | 0.01 | 355 | 49% |
| Practical Example 7 | EEP | 55.0 | J-1 1.0 | G-1 1.0 | 0.01 | 140 | 49% |
| Practical Example 8 | EEP | 55.0 | J-1 1.0 | G-1 1.0 | 0.01 | 128 | 49% |
| Practical Example 9 | EEP | 55.0 | J-1 1.0 | G-1 1.0 | 0.01 | 153 | 49% |
| Practical Example 10 | EEP | 55.0 | J-1 1.0 | G-1 1.0 | 0.01 | 140 | 49% |
| Practical Example 11 | EEP | 55.0 | J-1 1.0 | G-1 1.0 | 0.01 | 145 | 49% |
| Practical Example 12 | EEP | 88.0 | J-1 1.0 | G-1 1.0 | 0.01 | 206 | 49% |
| Practical Example 13 | EEP | 110.0 | J-1 1.0 | G-1 1.0 | 0.01 | 238 | 49% |
| Practical Example 14 | EEP | 110.0 | J-1 1.0 | G-1 1.0 | 0.01 | 262 | 49% |

TABLE 2-continued

| | | | | | | | | | |
|---|---|---|---|---|---|---|---|---|---|
| Production of coating material (D) | | | | | | | | | |
| Practical Example 15 | EEP | 55.0 | J-1 | 1.0 | G-1 | 1.0 | 0.01 | 129 | 49% |
| Practical Example 16 | EEP | 55.0 | J-1 | 1.0 | G-1 | 1.0 | 0.01 | 153 | 49% |
| Practical Example 17 | EEP | 55.0 | J-1 | 1.0 | G-1 | 1.0 | 0.01 | 154 | 49% |
| Practical Example 18 | EEP | 55.0 | J-1 | 1.0 | G-1 | 1.0 | 0.01 | 120 | 49% |
| Practical Example 19 | EEP | 55.0 | J-1 | 1.0 | G-1 | 1.0 | 0.01 | 122 | 49% |
| Comparative Example 1 | EEP | 55.0 | J-1 | 1.0 | G-1 | 1.0 | 0.01 | 119 | 49% |
| Comparative Example 2 | EEP | 55.0 | J-1 | 1.0 | G-1 | 1.0 | 0.01 | 218 | 49% |
| Comparative Example 31 | EEP | 55.0 | J-1 | 1.0 | G-1 | 1.0 | 0.01 | 162 | 49% |
| Comparative Example 4 | EEP | 55.0 | J-1 | 1.0 | G-1 | 1.0 | 0.01 | 124 | 49% |
| Comparative Example 5 | EEP | 110.0 | J-1 | 1.0 | G-1 | 1.0 | 0.01 | 214 | 49% |
| Comparative Example 6 | EEP | 55.0 | J-1 | 1.0 | G-1 | 1.0 | 0.01 | 113 | 49% |

The meaning of the abbreviations in Table 2 are presented below.

Polyisocyanate (C-1): DURANATE 24A-100 (trade name) made by Asahi Kasei Corporation (contains mainly biuret)

Polyisocyanate (C-2): DURANATE E402-80B (trade name) made by Asahi Kasei Corporation (contains mainly adduct)

Polyisocyanate (C-3): DURANATE A201H (trade name) made by Asahi Kasei Corporation (contains mainly allophanate)

Polyisocyanate (C-4): DURANATE TPA-100 (trade name) made by Asahi Kasei Corporation (contains mainly isocyanurate)

Polyurethane elastomer (E-1): Elastollan ET 890 (trade name) made by BASF

Polyesters (F-1): K-FLEX 188 (trade name) made by King Industries, Inc.

Polyesters (F-2): Desmophen C1200 (trade name) made by Covestro AG

Triazine-based ultraviolet absorbing agent (J-1): Eversorb 40 (trade name) made by Everlight Chemical Hindered amine-based light stabilizer (G-1): Eversorb 93 (trade name) made by Everlight Chemical

[Viscosity Measurement of Coating Materials (D-1) to (D-25)

1 ml of each coating material (D-1) to (D-25) was placed into a TVE 25L Viscometer (trade name) made by Toki Sangyo Co., Ltd, and viscosity was measured at 23° C.

when at 50 rpm. Evaluation results are presented in Table 2 with the indicators below.

◎: 50 mPa·s≤coating material viscosity≤5000 mPa·s, able to coat easily, sufficient film thickness could be obtained.

x: Coating material viscosity <50 mPa·s or coating material viscosity >5000 mPa·s, sufficient film thickness could not be obtained, or coating was difficult.

[Preparation of Topcoat Layer (A-1) and Lamination Film (H5-1)]

The top of release film GS (trade name) made by Lintec Corporation was coated with coating material (D-1) using an applicator to achieve a dry film thickness of 30 μm. Next, release film GS was stuck onto the coating film surface before drying so as to stick tightly. The thus obtained three-layer construction film in which a coating film layer was formed between release layers was heat dried for 4 days in an oven at 80° C. to obtain lamination film (H5-1). Subsequently, the release layer was removed to obtain a free film (single layer film) of topcoat layer (A-1).

[Preparation of Topcoat Layers (A-2) to (A-25) and Lamination Films (H5-2) to (H5-25)]

Lamination films (H5-2) to (H5-25) described in Table 3 were obtained by the same method as lamination (H5-1) using obtained coating materials (D-2) to (D-25). Subsequently, the release layers were removed to obtain free films of topcoat layers (A-2) to (A-25). Evaluation samples were taken of the free film of these topcoat layers (A-1) to (A-25), and testing was carried out as described below.

TABLE 3

| | | | | Total elongation | | | Pencil | Mold- | Weather | Chemical | Water |
|---|---|---|---|---|---|---|---|---|---|---|---|
| Practical example | Topcoat layer (A) | Release layer | Film (H5) | 23° C. | 60° C. | 100° C. | hardness | ability | resistance | resistance | resistance |
| Topcoat layer (A) composition and physical properties | | | | | | | | | | | |
| Practical Example 1 | A-1 | GS | H5-1 | ◎ | ○ | ○ | ◎ | ○ | ○ | ○ | ○ |
| Practical Example 2 | A-2 | GS | H5-2 | ◎ | ○ | ○ | ○ | ○ | ○ | ○ | ○ |
| Practical Example 3 | A-3 | GS | H5-3 | ◎ | ○ | ○ | ○ | ○ | ○ | ○ | ○ |
| Practical Example 4 | A-4 | GS | H5-4 | ◎ | ◎ | ○ | ◎ | ◎ | ◎ | ○ | ◎ |

TABLE 3-continued

Topcoat layer (A) composition and physical properties

| Practical example | Topcoat layer (A) | Release layer | Film (H5) | Total elongation 23° C. | 60° C. | 100° C. | Pencil hardness | Mold-ability | Weather resistance | Chemical resistance | Water resistance |
|---|---|---|---|---|---|---|---|---|---|---|---|
| Practical Example 5 | A-5 | GS | H5-5 | ⊚ | ⊚ | ○ | ⊚ | ⊚ | ⊚ | ○ | ⊚ |
| Practical Example 6 | A-6 | GS | H5-6 | ⊚ | ○ | ○ | ○ | ○ | ○ | ○ | ○ |
| Practical Example 7 | A-7 | GS | H5-7 | ⊚ | ○ | ○ | ⊚ | ○ | ○ | ○ | Δ |
| Practical Example 8 | A-8 | GS | H5-8 | ⊚ | ○ | ○ | ⊚ | ○ | ○ | ○ | ○ |
| Practical Example 9 | A-9 | GS | H5-9 | ⊚ | ○ | ○ | ○ | ○ | ○ | ○ | ○ |
| Practical Example 10 | A-10 | GS | H5-10 | ⊚ | ○ | Δ | ⊚ | ○ | ○ | Δ | Δ |
| Practical Example 11 | A-11 | GS | H5-11 | ⊚ | ⊚ | ⊚ | ⊚ | ⊚ | ⊚ | ⊚ | ⊚ |
| Practical Example 12 | A-12 | GS | H5-12 | ⊚ | ⊚ | ⊚ | ⊚ | ⊚ | ○ | ○ | ○ |
| Practical Example 13 | A-13 | GS | H5-13 | ⊚ | ○ | ○ | ⊚ | ○ | ⊚ | ○ | ○ |
| Practical Example 14 | A-14 | GS | H5-14 | ⊚ | ○ | ○ | ○ | ○ | ○ | ○ | ○ |
| Practical Example 15 | A-15 | GS | H5-15 | ⊚ | ○ | ○ | ○ | ○ | ○ | ○ | ○ |
| Practical Example 16 | A-16 | GS | H5-16 | ⊚ | ○ | ○ | ⊚ | ⊚ | ⊚ | ○ | ⊚ |
| Practical Example 17 | A-17 | GS | H5-17 | ⊚ | ○ | ○ | ⊚ | ○ | ○ | ○ | ○ |
| Practical Example 18 | A-18 | GS | H5-18 | ⊚ | ○ | ○ | ⊚ | ○ | ⊚ | ○ | ⊚ |
| Practical Example 19 | A-19 | GS | H5-19 | ⊚ | ○ | ○ | ⊚ | ○ | ⊚ | ○ | ⊚ |
| Comparative Example 1 | A-20 | GS | H5-20 | X | X | X | X | X | X | X | X |
| Comparative Example 2 | A-21 | GS | H5-21 | X | X | X | ⊚ | X | X | ○ | X |
| Comparative Example 3 | A-22 | GS | H5-22 | X | X | X | X | X | X | X | X |
| Comparative Example 4 | A-23 | GS | H5-23 | X | X | X | Δ | X | X | Δ | X |
| Comparative Example 5 | A-24 | GS | H5-24 | X | X | X | X | X | X | X | X |
| Comparative Example 6 | A-25 | GS | H5-25 | ○ | Δ | Δ | X | Δ | X | X | X |

Practical Example 20

[Preparation of Lamination Film (H1-1)]

On a horizontal table, primer (K-1) was applied to the surface of a 200 μm thick film of corona-treated, non-stretched polypropylene with an applicator to a dry film thickness of 5 μm. After letting stand at room temperature for 5 minutes, coating material (D-1) was applied with an applicator to a dry film thickness of 30 μm to form topcoat layer (A-1). Subsequently, this was heat dried for 4 days in an oven at 80° C. to obtain lamination film (H1-1).

[Practical Examples 21 to 29, 33 to 38], [Comparative Examples 7 to 12]

[Preparation of Lamination Film (H1-2 to 10, H1-14 to 25)]

Lamination films (H1-2 to 10, H1-14 to 25) described in Table 4 were obtained by the same method as lamination (H1-1) using coating materials (D2 to 10, 14 to 25). Evaluation samples were taken of these lamination films, and testing was carried out as described below.

TABLE 4

Lamination film (H) composition and physical properties

| Practical example | Lamination film (H) | Base material | Primer | Printed layer (L) | Adhesive layer | Release layer | Topcoat layer (A) | Coating material (D) | Total elongation 60° C. | 100° C. | Mold-ability | Weather resistance | Chemical resistance | Water resistance |
|---|---|---|---|---|---|---|---|---|---|---|---|---|---|---|
| Practical Example 20 | H1-1 | Polypropylene | K-1 | — | — | — | A-1 | D-1 | ○ | ○ | ○ | ○ | ○ | ○ |

TABLE 4-continued

Lamination film (H) composition and physical properties

| Practical example | Lamination film (H) | Base material | Primer | Printed layer (L) | Adhesive layer | Release layer | Topcoat layer (A) | Coating material (D) | Total elongation 60° C. | Total elongation 100° C. | Moldability | Weather resistance | Chemical resistance | Water resistance |
|---|---|---|---|---|---|---|---|---|---|---|---|---|---|---|
| Practical Example 21 | H1-2 | Polypropylene | K-1 | — | — | — | A-2 | D-2 | ◎ | ○ | ○ | ○ | ○ | ○ |
| Practical Example 22 | H1-3 | Polypropylene | K-1 | — | — | — | A-3 | D-3 | ◎ | ○ | ○ | ○ | ○ | ○ |
| Practical Example 23 | H1-4 | Polypropylene | K-1 | — | — | — | A-4 | D-4 | ◎ | ◎ | ◎ | ◎ | ◎ | ◎ |
| Practical Example 24 | H1-5 | Polypropylene | K-1 | — | — | — | A-5 | D-5 | ◎ | ◎ | ◎ | ◎ | ◎ | ◎ |
| Practical Example 25 | H1-6 | Polypropylene | K-1 | — | — | — | A-6 | D-6 | ○ | ○ | ○ | ○ | ○ | ○ |
| Practical Example 26 | H1-7 | Polypropylene | K-1 | — | — | — | A-7 | D-7 | ○ | ○ | ○ | ○ | ○ | Δ |
| Practical Example 27 | H1-8 | Polypropylene | K-1 | — | — | — | A-8 | D-8 | ○ | ○ | ○ | ○ | ○ | ○ |
| Practical Example 28 | H1-9 | Polypropylene | K-1 | — | — | — | A-9 | D-9 | ○ | ○ | ○ | ○ | ○ | ○ |
| Practical Example 29 | H1-10 | Polypropylene | K-1 | — | — | — | A-10 | D-10 | ○ | ○ | ○ | ○ | ○ | Δ |
| Practical Example 30 | H2-1 | Polypropylene | K-1 | L-1 | — | — | A-11 | D-11 | ◎ | ◎ | ○ | ○ | ○ | ◎ |
| Practical Example 31 | H3-1 | Polypropylene | K-1 | L-2 | — | — | A-12 | D-12 | ◎ | ◎ | ◎ | ○ | ○ | ○ |
| Practical Example 32 | H4-1 | Polypropylene | K-1 | — | 1310DT | GS | A-13 | D-13 | ◎ | ○ | ○ | ◎ | ◎ | ○ |
| Practical Example 33 | H1-14 | Polypropylene | K-1 | — | — | — | A-14 | D-14 | ◎ | ○ | ○ | ○ | ○ | ○ |
| Practical Example 34 | H1-15 | Polypropylene | K-1 | — | — | — | A-15 | D-15 | ○ | ○ | ○ | ○ | ○ | ○ |
| Practical Example 35 | H1-16 | Polypropylene | K-1 | — | — | — | A-16 | D-16 | ○ | ○ | ◎ | ◎ | ◎ | ◎ |
| Practical Example 36 | H1-17 | Polypropylene | K-1 | — | — | — | A-17 | D-17 | ○ | ○ | ◎ | ○ | ○ | ○ |
| Practical Example 37 | H1-18 | Polypropylene | K-1 | — | — | — | A-18 | D-18 | ○ | ○ | ◎ | ◎ | ◎ | ◎ |
| Practical Example 38 | H1-19 | Polypropylene | K-1 | — | — | — | A-19 | D-19 | ○ | ○ | ◎ | ◎ | ◎ | ◎ |
| Comparative Example 7 | H1-20 | Polypropylene | K-1 | — | — | — | A-20 | D-20 | X | X | X | X | X | X |
| Comparative Example 8 | H1-21 | Polypropylene | K-1 | — | — | — | A-21 | D-21 | X | X | X | X | ○ | X |
| Comparative Example 9 | H1-22 | Polypropylene | K-1 | — | — | — | A-22 | D-22 | X | X | X | X | X | X |
| Comparative Example 10 | H1-23 | Polypropylene | K-1 | — | — | — | A-23 | D-23 | X | X | X | X | Δ | X |

TABLE 4-continued

Lamination film (H) composition and physical properties

| Practical example | Lami-nation film (H) | Base material | Primer | Printed layer (L) | Adhe-sive layer | Release layer | Top-coat layer (A) | Coating material (D) | Total elongation | | Mold-ability | Weather resis-tance | Chemical resis-tance | Water resis-tance |
|---|---|---|---|---|---|---|---|---|---|---|---|---|---|---|
| | | | | | | | | | 60° C. | 100° C. | | | | |
| Compar-ative Exam-ple 11 | H1-24 | Polypro-pylene | K-1 | — | — | — | A-24 | D-24 | X | X | X | X | X | X |
| Compar-ative Exam-ple 12 | H1-25 | Polypro-pylene | K-1 | — | — | — | A-25 | D-25 | Δ | Δ | Δ | X | X | X |

The meaning of the abbreviation in Table 4 is as follows.
Primer (K-1): SUPERCHLON 930 (trade name) made by Nippon Paper Industries Co., Ltd.

Practical Example 30

[Preparation of Lamination Film (H2-1)]

On a horizontal table, primer (K-1) was applied to the surface of 200 μm thick film of corona-treated, non-stretched polypropylene with an applicator to a dry film thickness of 5 μm. After letting stand at room for 5 minutes, a continuous layer with a 1 μm dry film thickness was gravure printed using ink A to obtain printed layer (L-1).

After letting stand at room temperature for 5 minutes, coating material (D-11) was applied with an applicator to a dry film thickness of 30 μm to form topcoat layer (A-11). Subsequently, this was heat dried for 4 days in an oven at 80° C. to obtain lamination film (H2-1). Details of this lamination film (H2-1) are described in Table 4.

Note that aforementioned ink A was produced in advance by the method below.
<Production of Ink A>

10 parts of yellow pigment (C.I Pigment Yellow 83: LIONOL YELLOW 1805G, made by Toyocolor Co., Ltd.), 40 parts of polyurethane resin PU1 solution, 15 parts of vinyl chloride copolymer resin (Solbin TAR5 made by Nissin Chemical Industry Co., Ltd.: vinyl acetate: vinyl alcohol=88:1:11 (solid content 25% ethyl acetate solution)), 25 parts ethyl acetate, and 10 parts isopropanol (IPA) were mixed and stirred in a Disper mixer. Subsequently, this was dispersed for 10 minutes using a sand mill to obtain ink A.

In addition, aforementioned polyurethane PU1 was synthesized in accordance with the description below.
<Synthesis of Polyurethane Resin PU1>

100 parts polyester polyol having a number average molecular weight of 5,000, which is a condensate of 3-methyl-1,5-pentanediol and adipic acid, 24 parts polyester polyol having a number average molecular weight of 2,000, which is a condensate of propylene glycol and adipic acid, 16 parts polypropylene glycol having a number average molecular weight of 2,000, 20.5 parts isophorone diisocyanate, and 73.7 parts ethyl acetate were reacted for 4 hours at 80° C. under a nitrogen gas stream to obtain a solvent solution of terminal isocyanate urethane prepolymer. Next, the obtained terminal isocyanate urethane prepolymer solution was gradually added at 40° C. to a mixture of 8.2 parts isophoronediamine, 0.5 parts 2-ethanolamine, 222.9 parts ethyl acetate, and 127.1 parts isopropanol, and then reacted for 1 hour at 80° C. to obtain a polyurethane resin PU1 solution having a solid content of 30%, amine value of 3.5 mg KOH/g, hydroxyl value of 1.7 mg KOH/g, mass-average molecular weight of 50,000, and glass transition temperature of −40° C.

Practical Example 31

[Preparation of Lamination Film (H3-1)]

On a horizontal table, primer (K-1) was applied to the surface of a 200 μm thick film of corona-treated, non-stretched polypropylene with an applicator to a dry film thickness of 5 μm. After letting stand at room for 5 minutes, a pattern layer having a 1 μm dry film thickness was gravure printed using aforementioned ink A to obtain printing pattern layer (L-2). After letting stand at room temperature for 5 minutes, coating material (D-12) was applied with an applicator to a dry film thickness of 30 μm to form topcoat layer (A-12). Subsequently, this was heat dried for 4 days in an oven at 80° C. to obtain lamination film (H3-1). Details of lamination film (H3-1) are described in Table 4.

Practical Example 32

[Preparation of Lamination Film (H4-1)]

On a horizontal table, primer (K-1) was applied to the surface of a 200 μm thick film of corona-treated, non-stretched polypropylene with an applicator to a dry film thickness of 5 μm. After letting stand at room temperature for 5 minutes, coating material (D-13) was applied with an applicator to a dry film thickness of 30 μm to form topcoat layer (A-13). Next, release film GS (trade name) made by Lintec Corporation was stuck onto the coating film top surface before drying so as to stick firmly. The thus obtained four-layer construction film comprising base material, primer layer, topcoat layer (A-13), and release layer was heat dried for 4 days in an oven at 80° C. Subsequently, SK Dyne 1310DT (trade name) made by Soken Chemical & Engineering Co., Ltd. was applied to the opposite surface of the base material with an applicator to a dry film thickness of 100 μm to form an adhesive layer. Release film GS was then laminated onto the adhesive layer to obtain lamination film (H4-1). Details of lamination film (H4-1) are described in Table 4.

Evaluation testing of topcoat layers (A) and lamination films (H) produced as describe above was carried out in the manner described below.
<Evaluation>
[Total Elongation of Topcoat Layer (a)]

A free film of topcoat layer (A) was prepared with dimensions of initial length (L0)=30 mm, width=10 mm, and film thickness 30 μm, and measurements of total elongation were performed with a tension speed of 5 mm/min at temperatures 23° C., 60° C., and 100° C. using an Autoclave AG-IS (trade name) manufactured by Shimadzu Corporation. The length (L) at the point at which topcoat layer (A) broke was measured, and total elongation was determined by the following formula.

$$\text{Total elongation (\%)} = (L - L0)/L0 \times 100$$

Evaluation results are presented in Table 3 with the indicators below.
  ◎: Total elongation of 20% or greater.
  ○: Total elongation of 6% or greater and less than 20%.
  Δ: Total elongation of 3% or greater and less than 6%.
  x: Total elongation of less than 3%.
[Total Elongation of Lamination Film (H)]
  A sample of lamination film (H) was prepared with dimensions of initial length (L0)=30 mm and width=10 mm, and measurements of total elongation were performed with a tension speed of 5 mm/min at temperatures 60° C. and 100° C. using an Autoclave AG-IS (trade name) manufactured by Shimadzu Corporation. The length (L) at the point at which either layer broke was measured, and total elongation was determined by the following formula.

$$\text{Total elongation (\%)} = (L - L0)/L0 \times 100$$

Evaluation results are presented in Table 4 with the indicators below.
  ◎: Total elongation of 40% or greater.
  ○: Total elongation of 10% or greater and less than 40%.
  Δ: Total elongation of 5% or greater and less than 10%.
  x: Total elongation of less than 5%.
[Pencil Hardness of Topcoat Layer (a)]
  In the present invention, the pencil hardness of topcoat layer (A) was measured in accordance with ISO 15184.
  Evaluation results are presented in Table 3 with the indicators below.
  ◎: 2B or higher.
  ○: 4B or higher, 3B or lower.
  Δ: 6B or higher, 5B or lower.
  x: 7B or lower.
[Moldability]
[Topcoat Layers (A-1) to (A-25)]
  Free films of topcoat layers (A-1) to (A-25) of the practical examples and comparative examples were cut to size A4. The free film was placed over a 20 mm length×30 mm width×5 mm thickness metal mold with curved surface part R5 and was molded with a vacuum molding machine at heating temperatures 23° C., 60° C., and 100° C. That is, using a metal mold as a press base having a curved surface part, the press base pressed in a condition which covered almost the entire surface of the free film. Subsequently, fractures in the free film molded topcoat layers (A-1 to 25) were observed using a loupe.
  Evaluation results are presented in Table 3 with the indicators below.
  ◎: Absolutely no fractures were observed.
  ○: Some fractures.
  Δ: Moderate amount of fractures.
  x: Many fractures.

[Lamination films (H1-1) to (H1-10), (H1-14) to (H1-25), (H2-1), (H3-1), (H4-1)]
  Topcoat lamination films (H1-1) to (H1-10), (H1-14) to (H1-25), (H2-1), (H3-1), and (H4-1) of the practical examples and comparative examples were cut to size A4. The lamination films were placed over a 20 mm length×30 mm width×5 mm thickness metal mold with curved surface part R5 and were molded with a vacuum molding machine at heating temperatures 60° C., and 100° C. That is, using a metal mold as a press base having a curved surface part, the press base pressed in a condition which covered almost the entire surface of the lamination film. Subsequently, fractures in the lamination film molded topcoat layers (H1-1) to (H1-10), (H1-14) to (H1-25), (H2-1), (H3-1), and (H4-1) were observed using a loupe. Note that for lamination film H4-1, the test was carried out after removing the release layers on both sides.
  Evaluation results are presented in Table 4 with the indicators below.
  ◎: Absolutely no fractures were observed.
  ○: Some fractures.
  Δ: Moderate amount of fractures.
  x: Many fractures.
[Weather Resistance]
  [Topcoat layers (A1) to (A-25)], [lamination films (H1-1) to (H1-10), (H1-14) to (H1-25), (H2-1), (H3-1), and (H4-1)] topcoat layers and lamination films (H1-1) to (H1-10), (H1-14) to (H1-25), (H2-1), (H3-1), and (H4-1) were each subject to 3000 hours of exposure using a sunshine carbon arc lamp type accelerated weatherability tester (JISK-5400 (1990) 9.8.1), and subsequently, sample conditions were visually assessed. Note that with the free film for topcoat layer (A) and lamination film (H4-1), testing was carried out after removing the release layers on both sides.
  Evaluation results are presented in Table 3 and Table 4 with the indicators below.
  ◎: Almost no change seen.
  ○: Slight whitening or base material separation seen.
  Δ: Whitening or base material separation seen, but still usable.
  x: Marked whitening or base material separation seen, and not usable.
[Chemical Resistance]
[Topcoat layers (A-1) to (A-25)], lamination films (H1-1) to (H1-10), (H1-14) to (H1-25), (H2-1), (H3-1), (H4-1)]
  A 0.2 ml spot of 40% sulfuric acid aqueous solution was placed onto a sample and heated to 60° C. for 15 minutes. Subsequently, the sample was rinsed with water, and the degree to which staining occurred was observed visually. Note that with the free film for topcoat layer (A) and lamination film (H4-1), testing was carried out after removing the release layers on both sides.
  Evaluation results are presented in Table 3 and Table 4 with the indicators below.
  ◎: Almost no change seen.
  ○: Slight water stain seen.
  Δ: Water stain seen, but usable.
  x: Marked water stain seen, and not usable.
[Water Resistance]
  Samples of [topcoat layers (A-1) to (A-25)], lamination films (H1-1) to (H1-10), (H1-14) to (H1-25), (H2-1), (H3-1), and (H4-1)] were soaked in 40° C. warm water for 240 hours, and subsequently, the external appearance (wrinkling, cracking) was observed visually. Note that with the free film for topcoat layer (A) and lamination film (H4-1), testing was carried out after removing the release layers on both sides.

Evaluation results are presented in Table 3 and Table 4 with the indicators below.

⊚: Almost no change seen.

◯: Slight amount of wrinkling and cracking seen.

Δ: Wrinkling and cracking seen, but usable.

x: Marked wrinkling and cracking seen, and not usable.

The invention carried out by the inventors has been concretely described based on the embodiments above, however, it goes without saying that the present invention is not limited by the above embodiments, and various changes can be made in the scope that do not deviate from the substance of the present invention.

INDUSTRIAL APPLICABILITY

Topcoat layer (A) of the present invention has good moldability, and decorative component (I) that has been decorated by lamination film (H), in which topcoat layer (A) has been additionally laminated onto the surface of an arbitrary base material, has excellent external appearance, chemical resistance, water resistance, and weather resistance, and because of this, is applicable to, for example, automotive bodies, bumpers, both interior and exterior automotive components, building material components, everyday articles, home appliance components, interior parts, ship components, and the like, and in particular, can be used suitable for automotive plastic components.

DESCRIPTION OF THE REFERENCE NUMERALS

1 Base material
2 Primer layer
(A) Topcoat layer (A)
3 Printed layer
4 Printing pattern layer
5 Release layer
6 Adhesive layer

The invention claimed is:

1. A topcoat layer (A) satisfying below conditions (1) to (3):

is formed by applying a coating of a coating material (D) comprising essential components acrylic polymer (B), which includes a hydroxyl group and has a glass transition temperature of from −50° C. to 30° C.; a polyisocyanate (C); and a solvent;

has a total elongation of 3% or greater in the temperature range of from 20 to 120° C.;

has a pencil hardness of 6B or higher measured in accordance with ISO 15184, wherein the acrylic polymer (B) is a copolymer of a hydroxyl group containing monomer (a) and another monomer (c), or of a hydroxyl group-containing monomer (a), a carboxyl group-containing monomer (b) and other monomer (c), wherein the copolymer is composed of two or more of the hydroxyl group containing monomer (a) selected from the group consisting of 2-hydroxyethyl acrylate (HEA), 2-hydroxyethyl methacrylate (HEMA), 2-hydroxy propyl acrylate (HPA), 2-hydroxypropyl methacrylate (HPMA), 4-hydroxybutyl acrylate (4-HBA), and glycerol monomethacrylate, and wherein the polyisocyanate (C) is one or more species selected from the group consisting of a biuret, isocyanurate, adduct, uretdione, and allophanate of a compound having two or more isocyanate groups within the molecule.

2. The topcoat layer (A) according to claim 1, wherein a hydroxyl value of acrylic polymer (B) is from 80 to 220 mg KOH/g.

3. The topcoat layer (A) according to claim 1, wherein the polyisocyanate (C) is aliphatic polyisocyanate.

4. The topcoat layer (A) according to claim 1, wherein the coating material (D) further includes one or more species selected from the group consisting of polyurethane elastomer (E) and polyester (F).

5. The topcoat layer (A) according to claim 1, wherein a content ratio of isocyanate groups in polyisocyanate (C) to hydroxyl groups in the acrylic polymer (B) expressed as the NCO/OH mole ratio is from 0.5 to 1.7.

6. The topcoat layer (A) according to claim 1, wherein the coating material (D) further includes hindered amine-based light stabilizer (G).

7. A lamination film (H) wherein the topcoat layer (A) according to claim 1, is laminated onto a base material.

8. The lamination film (H) according to claim 7, having a printed layer between the base material and the topcoat layer (A).

9. The lamination film (H) according to claim 7, wherein the total elongation is 5% or greater in the temperature range of from 60 to 120° C.

10. The lamination film (H) according to claim 7, wherein the base material is polypropylene.

11. The lamination film (H) according to claim 7, wherein a release layer is further laminated onto the topcoat layer (A).

12. A decorative article (I) decorated by the lamination film (H) according to claim 7.

* * * * *